United States Patent [19]

Okazaki et al.

[11] Patent Number: 4,666,882

[45] Date of Patent: May 19, 1987

[54] METHOD OF PREPARATION OF CATALYST AND CATALYST PREPARED BY THE METHOD FOR CONVERTING NITROGEN OXIDES IN EXHAUST GASES

[75] Inventors: Susumu Okazaki, Ibaragi; Satoshi Kado, Kanagawa, both of Japan

[73] Assignee: CBMM Internacional Ltda., Sao Paulo, Brazil

[21] Appl. No.: 752,428

[22] Filed: Jul. 8, 1985

[30] Foreign Application Priority Data

Jul. 17, 1984 [JP] Japan ................... 59-147054

[51] Int. Cl.$^4$ ............................................. B01J 23/84
[52] U.S. Cl. ..................................... 502/338; 423/239
[58] Field of Search ................ 502/338, 353; 423/239, 423/239 A

[56] References Cited

U.S. PATENT DOCUMENTS 4,138,368 2/1979 Kiyomiya et al. ............. 502/337 X
4,329,517 5/1982 Taniguchi et al. ............. 502/338 X Primary Examiner—W. J. Shine
Attorney, Agent, or Firm—Beveridge, DeGrandi & Weilacher

[57] ABSTRACT

A catalyst for removing nitrogen oxides from an exhaust gas comprises a composite oxide or mixture of niobic acid or niobium oxide with iron oxide or hydrated iron oxide. The catalyst contains atoms of niobium and atoms of iron in a ratio Nb/Fe not exceeding about 1. The catalyst is useful for converting nitrogen oxides in an exhaust gas to nitrogen gas by contacting the exhaust gas with the catalyst in the presence of a reducing gas, such as ammonia. The catalyst can be prepared by impregnation or coprecipitation.

6 Claims, 3 Drawing Figures

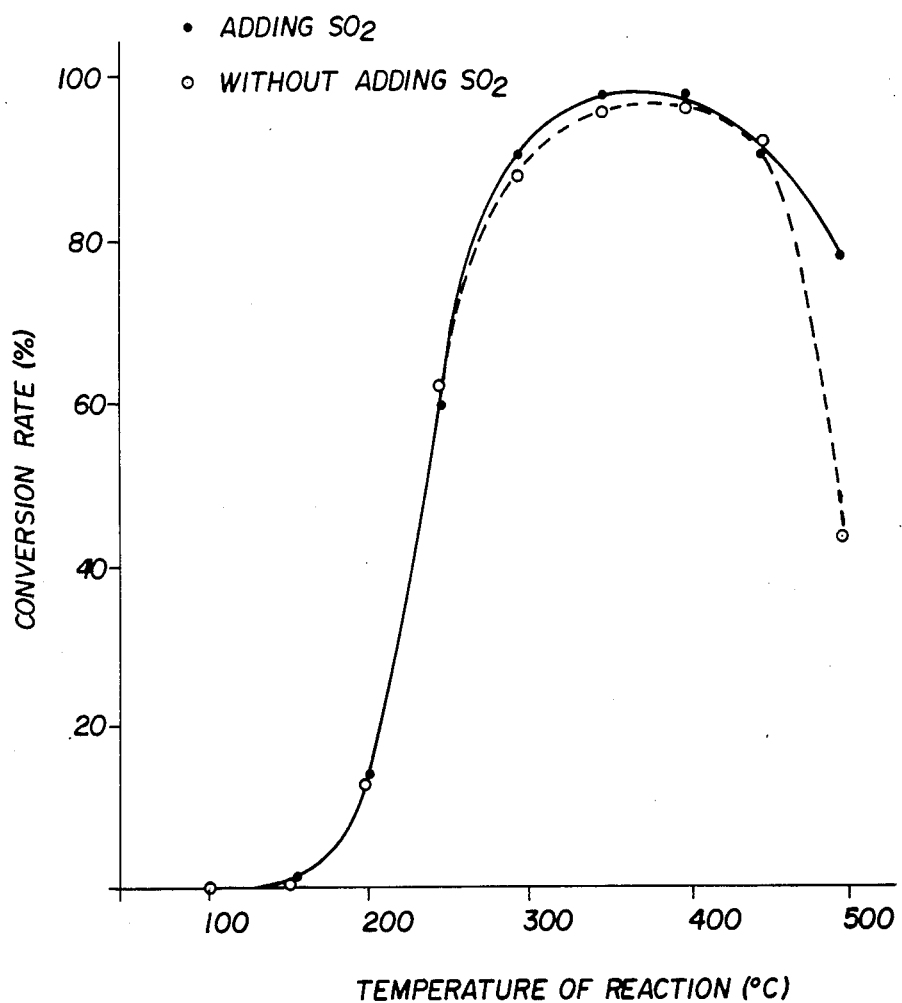

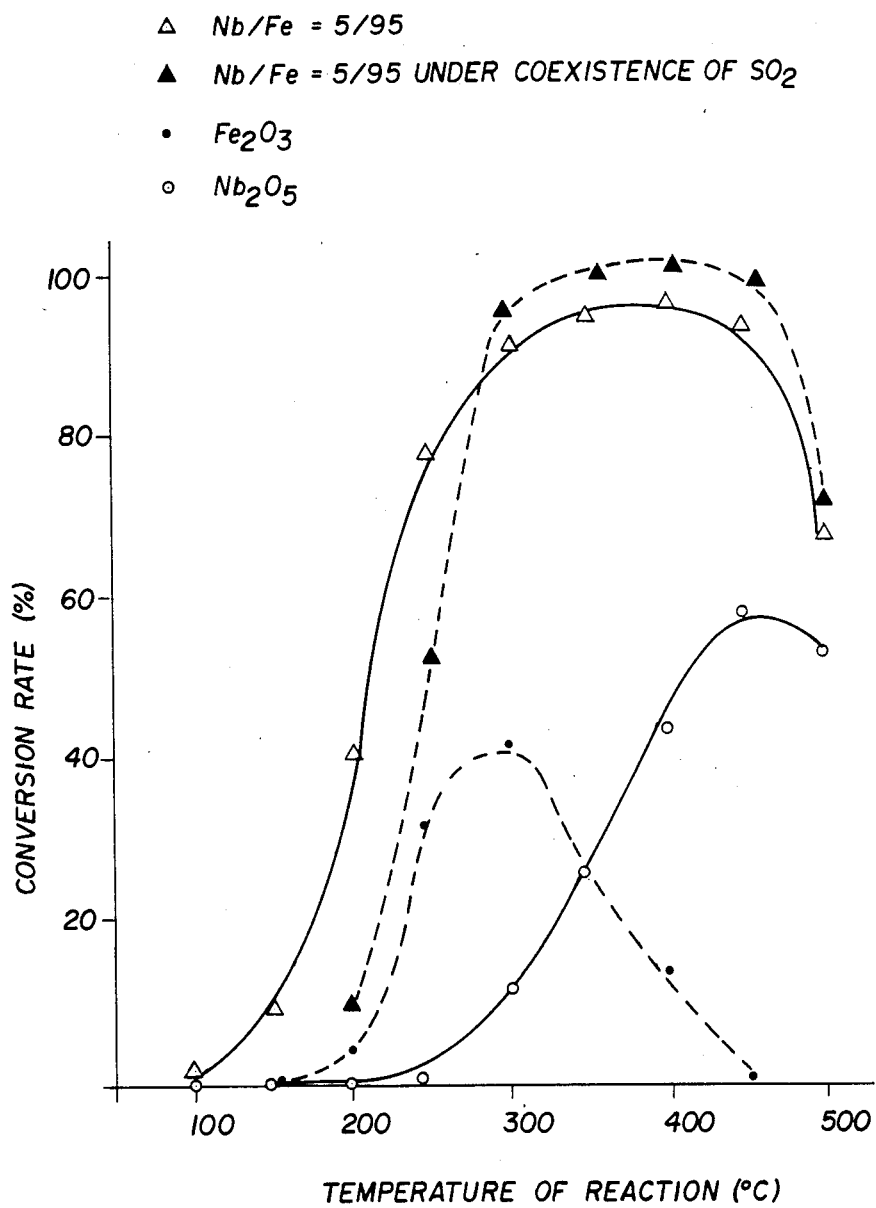

METHOD OF PREPARATION OF CATALYST AND CATALYST PREPARED BY THE METHOD FOR CONVERTING NITROGEN OXIDES IN EXHAUST GASES

BACKGROUND OF THE INVENTION

This invention relates to a catalyst, its method of preparation and its use in converting nitrogen oxides in exhaust gases. More particularly, the invention relates to a catalyst useful for converting nitrogen oxides in exhaust gases from furnaces, coke works and boilers, by adding a reducing gas, such as ammonia, to the exhaust gas and reacting the nitrogen oxides in the presence of the catalyst to form nitrogen. The catalyst is comprised mainly of a double oxide of niobium and iron.

Atmospheric pollution containing nitrogen oxides ($NO_x$) from exhaust gases discharged into the atmosphere has been increasing its noxious effects year after year in the vicinity of large industrial centers. Finding a solution to the problem of atmospheric pollution is a task of great importance which should be carried out as soon as possible.

The method of selective reduction of nitrogen oxides by dry means converts harmful nitrogen oxides to inert nitrogen gas. The method is carried out with a reducing gas, such as ammonia. The method is readily carried out and results in the removal of nitrogen oxides to a high degree. In comparison with methods based on humid conditions, selective reduction by dry means is less costly, does not require the treatment of residual liquids and requires less maintenance. Because of these advantages, selective reduction by dry means is close to its final stage of development for practical application.

Iron oxides are used as catalysts in selective reduction by dry means. These materials are relatively cheap and in abundant supply. Vanadium oxides, titanium oxide, etc. are also known for use in the method, there being many publications up to the present time.

Since the known method of selective reduction by dry means still presents many problems, there is ample room for further study and research. Among the significant remaining problems is the decrease in catalytic activity when the known catalysts are used to treat exhaust gases containing sulphur oxides. Another significant problem, especially in the case of iron catalysts, is an undesired catalytic side reaction, namely, acceleration of oxidation of the ammonia that is present to convert the nitrogen oxides to inert nitrogen. Oxidation of the ammonia further increases the amount of nitrogen oxides. Furthermore, in the case of various multiple oxides (or mixtures of oxides) as catalysts, catalytic activity has been found to be dependent on thermal conditions, and this has been found to restrict the temperature range in which the catalyst can be employed.

SUMMARY OF THE INVENTION

The inventors, after extensive research and countless tests, discovered that a catalyst prepared by the formation of double oxide containing niobium oxide and iron oxide exhibits catalytic activity and is resistant to sulphur oxides ($SO_x$) even at low reaction temperatures, such as 250° C. or even at a temperature lower than 200° C. In addition, the catalyst shows markedly high catalytic activity, and though belonging to the series of iron oxides, ammonia gas is not substantially oxidized when the catalyst is used in treating an exhaust gas in the selective reduction method. The catalyst can be employed at relatively low temperature levels.

Accordingly, this invention provides a catalyst for removing nitrogen oxides from an exhaust gas. The catalyst consists essentially of a composite oxide or mixture of niobic acid (hydrated niobium oxide) or niobium oxide with iron oxide or hydrated iron oxide, wherein the catalyst contains atoms of niobium and atoms of iron in a ratio of niobium/iron not exceeding about 1.

This invention also provides a method of converting nitrogen oxide in an exhaust gas to nitrogen gas. The method comprises contacting gaseous nitrogen oxide with a catalyst of the invention in the presence of ammonia gas under conditions to convert nitrogen oxide to nitrogen substantially without oxidation of ammonia gas.

In addition, this invention provides a method of making a catalyst of the invention by impregnation. The method comprises dissolving niobic acid in an aqueous oxalic acid solution. The solution is mixed with an iron oxide or hydrated iron oxide while stirring and heating to evaporate liquid and concentrate the resulting dispersion. Solids are separated from the dispersion and dried. The solids are activated by heat treating in air at a temperature of about 150° C. to about 600° C. to form the catalyst. The effect of $SO_4^{2-}$ can be examined by adding a given amount of sulfuric acid, ammonium sulfate or ammonium bisulfate to a part of a carrier sample impregnated with the above-mentioned solution or by dissolution or partial dissolution of niobic acid in a nonaqueous solution of sulfuric acid, ammonium sulfate or ammonium bisulfate, instead of an aqueous warm solution of oxalic acid.

Finally, this invention provides a method of making a catalyst of the invention by coprecipitation. The coprecipitation method comprises dissolving niobic acid in an aqueous oxalic acid solution. The solution is mixed with soluble iron compounds, such as ferric nitrate, to form a second solution. The second solution is mixed with ammonium hydroxide to neutralize the solution and form a precipitate. The precipitate is successively washed with water until the resulting used wash liquid has a pH less than about 7. The precipitate is dried and then activated by heat treating in air at a temperature of about 150° C. to about 600° C. to form the catalyst.

BRIEF DESCRIPTION OF THE DRAWINGS

This invention will be more readily understood from the following detailed description and the accompanying drawings in which:

FIG. 2 shows the influence of $SO_2$ on the double catalyst of iron and niobium oxide (Nb/Fe=50/50) prepared by the coprecipitation method.

FIG. 3 shows the catalytic activities of catalysts of iron oxide and niobium oxide individually, and of a mixture of these oxides as catalysts prepared by the impregnation method (Nb/Fe=5/95).

DETAILED DESCRIPTION

Figure 1:
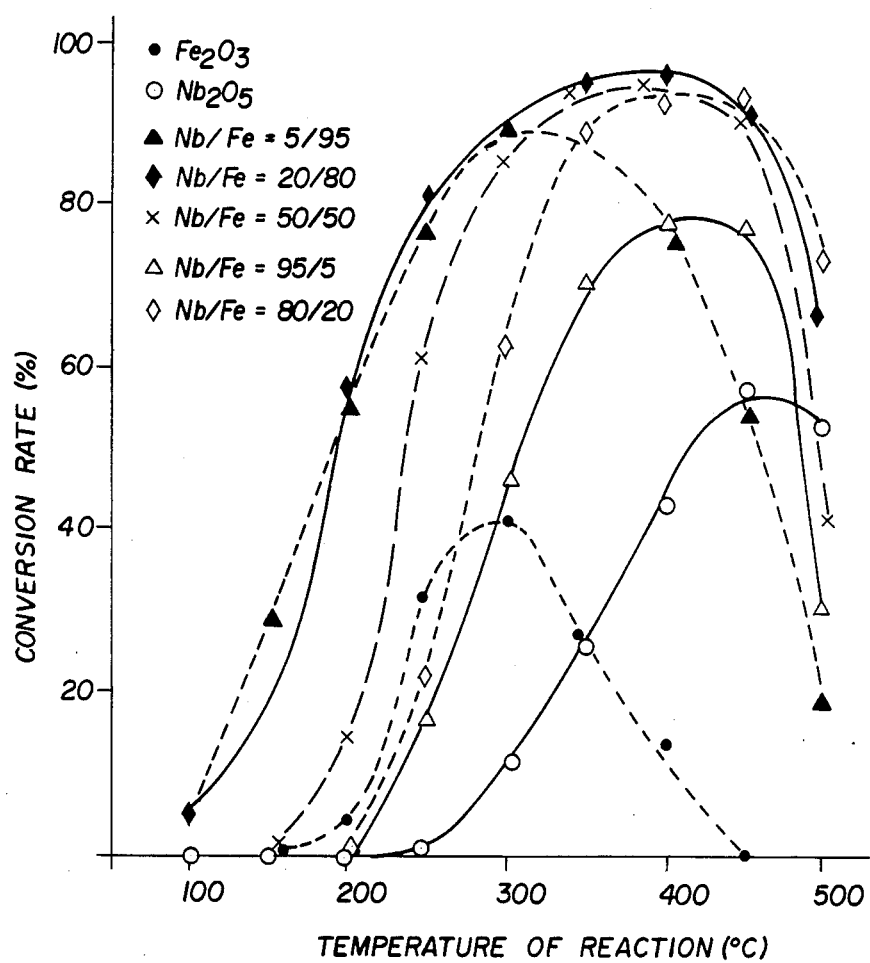
FIG. 1 is a diagram of the conversion rate of $NO_x$ to $N_2$ at different reaction temperatures using ferric oxide ($Fe_2O_3$) and niobium oxide individually as catalysts, and a series of catalysts of double oxide prepared by the coprecipitation of iron and niobium with various Nb/Fe atomic ratios.

Firstly, an explanation will be given of the method of production of the catalyst that is an object of the present invention.

The catalyst of the invention can be obtained by impregnating iron oxide with Nb. As a new material source for niobium, niobic acid is used, i.e., hydrated niobium oxide ($Nb_2O_5 \cdot xH_2O$). The niobic acid is carefully dissolved in a solution of 10% oxalic acid. To this solution is added the iron oxide, such as FeO, $Fe_2O_3$ and $Fe_3O_4$, or hydrated iron oxides, and after obtaining a good mixture, stirring is carried out with heating and concentration of the dispersion by evaporation.

After that, the liquid portion is separated either directly or by means of decantation. The solid portion is dried at a temperature of 120° C., and subsequently heated at a temperature of 300° to 600° C. in the presence of ambient air. However, when it is desirable to obtain a catalyst with high catalytic activity at a relatively low temperature level, heating of the iron oxide or hydrated iron oxide containing niobium, obtained as previously explained, should be carried out between 150° and 300° C. The effect of $SO_4^{2-}$ can be examined by adding a given amount of sulfuric acid, ammonium sulfate or ammonium bisulfate to an aqueous solution of oxalic acid with dissolved niobic acid, prior to the addition of iron oxide or hydrated iron oxide to this solution or by addition of niobic acid to an aqueous solution of sulfuric acid, ammonium sulfate or ammonium bisulfate, and heating at a temperature above ambient temperature up to the boiling point of the solution until it is converted to a partially dissolved, dispersed system or slurry. To this system is added the iron oxides, such as FeO, $Fe_2O_3$, $Fe_3O_4$ or hydrated iron oxides, and after obtaining a good mixture, stirring is carried out with heating and concentration of the dispersion by evaporation.

The catalyst of the invention can be obtained by means of coprecipitation by heating the aqueous solution of oxalic acid containing niobium oxide in a water-bath at a temperature of 70° C., dissolving a quantity of niobic acid in the solution and adding an iron soluble compound, such as a ferric nitrate, to this solution. After good stirring, a solution of ammonium hydroxide is added to neutralize the solution and to form the precipitate. The precipitate is repeatedly washed and decanted until the pH of the floating liquid is less than 7. After that, the precipitate is dried by heating, similar to the impregnation method previously mentioned.

The catalyst thus prepared can be used in pulverized form as obtained or, according to need, it can be molded in cylindric or conic form or in pellets.

An explanation will be given below concerning the constitution of the active compounds of the catalyst of the present invention.

FIG. 1 shows the conversion rate of $NO_x$ to $N_2$ at various temperatures in relation to the proportion of number of atoms of Nb and Fe. As shown in the Figure, when the catalyst includes only the iron oxide the conversion rate is low, but when to it is added a small quantity, or a quantity less than the equivalent quantity of niobium compound, the catalytic activity increases markedly. However, when the ratio of the number of atoms (Nb/Fe) is between 5/95 to 50/50 the conversion rate is very high, but as the proportion of Nb goes up from 80/20 to 95/5 the conversion rate decreases. The catalytic activity of the niobium oxide itself is very low in the reducing reaction of $NO_x$ with $NH_3$. Therefore, if the niobium content is excessively increased, this makes the ratio of the number of atoms of niobium to iron exceed 1, and thus the surface of the catalyst will be exclusively covered by niobium oxide and the catalytic activity of the double oxide is greatly reduced. So the quantity of niobium must be less than 1 atom for each one of the atoms of iron.

Below is given an explanation through practical examples.

EXAMPLE 1

Twenty grams of niobic acid (proportion of niobium = 67.4%) was placed in a hot solution of oxalic acid and the solution was kept in a water-bath at a temperature of 70° C. After being completely dissolved by stirring, 59 g. of hydrated ferric nitrate [$Fe(NO_3)_3 \cdot 9H_2O$] was added to the solution and again it was dissolved by constant stirring. Then to this aqueous solution containing two materials Nb and Fe (III) was added a solution of 28% ammonium hydroxide. The precipitate thus obtained was submitted to successive washing and decantation until the floating liquid of the decanted precipitate had a pH less than 7. After that, the precipitate was dried at a temperature of 120° C. for 8 hours in the presence of ambient air and subsequently heated at a temperature of 500° C. for 3 hours. About 100 g of double oxide of niobium and iron were thus obtained.

About 2 g of this catalyst was added to a tubular glass reactor (approximate inner diameter 20 mm). A mixture of $NO_x$ and $NH_3$ in equal quantities was fed to the reactor with concentration controlled through air flux so that the concentration of each reagent was maintained the same at 700 ppm at a space velocity equal to $50,000^{-1}$. The temperature was varied between 150° C. and 500° C. during the reaction. After the reaction, the gas was washed with sulphuric acid, a sample of the gas was taken and the concentration of NO was measured with a $NO_x$ meter. The conversion rate (reaction) was calculated, and the results are shown in FIG. 2 by the curve connecting the —O—.

Gaseous $SO_2$ at a concentration equal to 700 ppm was subsequently added to the flux. A new reaction was carried out with the other conditions identical to the previous test. The conversion rate is shown by the black points appearing in FIG. 2, which demonstrates that the values of the conversion rate at a low temperature were higher relative to the test carried out without $SO_2$ being added.

More particularly, FIG. 2 shows the effect of addition of $SO_2$ in a synthetic exhaust gas on catalytic activity of composite material. The dashed line was obtained by using, as synthetic exhaust gas, air plus 700 ppm $NO_x$ and 700 ppm $NH_3$. The solid line was obtained by using, as synthetic exhaust gas, air plus 700 ppm $NO_x$, 700 ppm $SO_2$ and 700 to 1400 ppm $NH_3$. Variations of $NH_3$ content in the synthetic exhaust gas did not significantly influence the conversion rate.

EXAMPLE 2

Ferric nitrate is dissolved in water, which has passed through an ion exchange resin, and the resulting solution is added to a 28% ammonia solution until the pH = 9 to precipitate ferric hydroxide. Washing and decantation are effected 5 to 6 times until the pH becomes approximately equal to 7. After that filtration is carried out in a vacuum filter and drying is conducted at a temperature of 120° C. in ambient air for 12 hours. Powdered ferric (III) oxide is obtained.

About 5 g of niobic acid was dissolved in a hot solution of oxalic acid containing 110 g of the dry ferric (III) oxide prepared as previously explained. Drying was effected by evaporation with constant stirring thus impregnating the ferric oxide with the niobium compound.

Subsequently, it was dried at a temperature of 120° C. for 8 hours in ambient air and a pulverized material was obtained with a ratio of the number of atoms of Nb to Fe equal to 5/95. The pulverized material thus obtained was ground until it could pass a 42 mesh screen. It was then heat treated at a temperature of 500° C. for 3 hours in ambient air. The material thus prepared was molded by pressure and its grains were standardized between 14 to 20 mesh to serve as catalyst.

Reactions were carried out similar to the reaction explained in Example 1. The reactions were conducted at several temperatures in a glass reactor with NO equal to 500 ppm, $NH_3$ equal to 500 ppm and $SO_2$ equal to 1200 ppm (only in the case of "Δ"). The results of the experiments are shown in FIG. 3. Even in the case where there was impregnation of a small quantity of Nb on the iron oxide (Nb/Fe=5/95), a high catalytic activity was obtained; the catalytic activity was practically equal to the activity of the catalyst obtained by the coprecipitation method in Example 1, which also exhibited good resistance to $SO_2$.

As explained above, the present invention can be employed to treat gases containing sulphur oxides without a decrease in catalytic activity. The catalyst of the invention also exhibits only a small dependence on temperature; catalytic activity is maintained over a wide range of temperatures.

What is claimed is:

1. A method of making a catalyst by impregnation comprising a composite oxide or mixture of niobic acid or niobium oxide with iron oxide or hydrated iron oxide, wherein said catalyst contains atoms of Nb and atoms of Fe in a ratio Nb/Fe not exceeding about 1, said method comprising
    dissolving niobic acid in an aqueous oxalic acid solution;
    mixing the solution with an iron oxide while stirring and heating to evaporate liquid and concentrate the resulting solution;
    separating solids from the solution and drying the solids; and
    activating the solids by heat treating in air at a temperature of about 150° C. to about 600° C. to form the catalyst.

2. Method according to claim 1 wherein heat treating is carried out at a temperature of about 150° C. to about 300° C.

3. A method of making a catalyst by coprecipitation, wherein said catalyst comprises a composite oxide or mixture of niobic acid or niobium oxide with iron oxide or hydrated iron oxide, wherein said catalyst contains atoms of Nb and atoms of Fe in a ratio Nb/Fe not exceeding about 1, said method comprising
    dissolving niobic acid in an aqueous oxalic acid solution;
    mixing the solution with iron soluble compound to form a second solution;
    mixing the second solution with ammonium hydroxide to neutralize the solution and form a precipitate;
    successively washing the precipitate with water until the resulting used wash liquid has a pH less than about 7;
    drying the precipitate; and
    activating the precipitate by heat treating in air at a temperature of about 150° C. to about 600° C. to form the catalyst.

4. Method according to claim 3 wherein the iron soluble compound is ferric nitrate.

5. Catalyst prepared according to the method of claim 3.

6. Catalyst prepared according to the method of claim 4.

* * * * *